(12) United States Patent
Idgunji et al.

(10) Patent No.: US 9,141,338 B2
(45) Date of Patent: Sep. 22, 2015

(54) STORAGE CIRCUIT WITH RANDOM NUMBER GENERATION MODE

(71) Applicant: ARM Limited, Cambridge (GB)

(72) Inventors: Sachin Satish Idgunji, San Jose, CA (US); Vikas Chandra, San Jose, CA (US)

(73) Assignee: ARM Limited, Cambridge (GB)

( * ) Notice: Subject to any disclaimer, the term of this patent is extended or adjusted under 35 U.S.C. 154(b) by 316 days.

(21) Appl. No.: 13/678,621

(22) Filed: Nov. 16, 2012

(65) Prior Publication Data

US 2014/0143291 A1    May 22, 2014

(51) Int. Cl.
*G06F 7/58* (2006.01)

(52) U.S. Cl.
CPC .............. *G06F 7/588* (2013.01); *G06F 7/582* (2013.01)

(58) Field of Classification Search
USPC ................................................. 708/250–256
See application file for complete search history.

(56) References Cited

U.S. PATENT DOCUMENTS

| | | | |
|---|---|---|---|
| 6,593,788 | B1 | 7/2003 | Vogts |
| 8,285,767 | B2 | 10/2012 | Chandra |
| 2004/0213407 | A1 | 10/2004 | Fujita et al. |
| 2009/0002044 | A1* | 1/2009 | Kobayashi ..................... 327/203 |
| 2009/0172055 | A1 | 7/2009 | Radja et al. |
| 2009/0248771 | A1* | 10/2009 | Vergnes et al. ................ 708/251 |
| 2011/0128081 | A1 | 6/2011 | Hars |

FOREIGN PATENT DOCUMENTS

JP    2012-129784    7/2012

OTHER PUBLICATIONS

Bochard et al., "True-Randomness and Pseudo-Randomness in Ring Oscillator-Based True Random Number Generators", *International Journal of Reconfigurable Computing*, vol. 2010, Article ID 879281, 13 pages.
Schellekens et al., "FPGA Vendor Agnostic True Random Number Generator", *Katholieke Universiteit Leuven*, No Date, 6 pages.
Sunar et al., "A Provably Secure True Random Number Generator with Built-in Tolerance to Active Attacks", *IEEE Transactions on Computers*, vol. 56, No. 1, Jan. 2007, pp. 106-119.
Tokunaga et al., "True Random Number Generator With a Mestatability-Based Quality Control", *IEEE Journal of Solid-State Circuits*, vol. 43, No. 1, Jan. 2008, pp. 78-85.
Yoo et al., "Improving the Robustness of Ring Oscillator TRNGs", *National Security Research Institute*, Oct. 2008, 35 pages.
UK Search Report dated Jan. 31, 2014 in GB 1316398.5.

* cited by examiner

*Primary Examiner* — Chuong D Ngo
*Assistant Examiner* — Calvin M Brien
(74) *Attorney, Agent, or Firm* — Pramudji Law Group PLLC; Ari Pramudji

(57) ABSTRACT

A storage circuit 2 in the form of a master slave latch includes a slave stage 6 serving as a bit storage circuit. The slave stage 6 includes an inverter chain which when operating in a normal mode includes an even number of inverters 10, 12 and when operating in an random number generation mode includes an odd number of inverters 10, 12, 14 and so functions as a free running ring oscillator. When a switch is made back from the random number generation mode to the normal mode, then the oscillation ceases and a stable pseudo random bit value is output from the bit value storage circuit 6.

14 Claims, 4 Drawing Sheets

| CLK (clock) | RGEN (random gen) | Q (output) |
|---|---|---|
| 0 | 1 | Oscillating output with phase noise # |
| 0 | 0 | Q (old) stable * |
| 1 | X | Q (master) * |

\# random number generation mode
\* normal mode

STORAGE CIRCUIT WITH RANDOM NUMBER GENERATION MODE

BACKGROUND OF THE INVENTION

1. Field of the Invention

This Invention relates to the field of data processing systems. More particularly, this invention relates to the field of storage circuits for receiving and storing a data value.

2. Description of the Prior Art

It is known to provide data processing systems which include storage circuits that receive and store data values. Known storage circuits that receive and store data values include, for example, master-slave latches, transparent latches and the like. These storage circuits serve as sequential elements which receive a data value from outside the storage circuit, store that data value and then output that data value to another portion of the system.

Within some data processing systems it is desirable to have hardware which is able to generate a pseudo random bit value, which may be used in combination with other pseudo random bit values or circuitry to generate a multi-bit pseudo random number. Pseudo random numbers are useful for a variety of purposes, such as in security related applications. One example of a pseudo random number generator is described in granted U.S. Pat. No. 8,285,767 which is assigned to the same assignee as the present application. This pseudo random number generator is a self-contained circuit which is dedicated to the generation of a random bit value.

SUMMARY OF THE INVENTION

Viewed from one aspect the present invention provide a storage circuit having a normal mode for receiving and storing an external bit value and a random number generation mode, said data value storage circuit comprising:

a bit value storage circuit having an input node for receiving an input bit value from outside said bit value storage circuit and an output node for outputting an output bit value;

wherein said bit value storage circuit is configured such that:

(i) when said storage circuit is operating in said normal mode, said bit value storage circuit generates at said output node as said output bit value a stable output bit value corresponding to said external bit value; and (ii) when said storage circuit is operating in said random number generation mode, said bit value storage circuit generates at said output node an oscillating output bit value and a change from said random number generation mode to said normal mode leaves said output bit value as a stable pseudo random bit value.

The present techniques recognise that a storage circuit which has a normal mode for receiving and storing an external bit value already contains many circuit elements which can be reused to generate a pseudo random bit value. In particular, the bit value storage circuit which operates in the normal mode to generate a stable output bit value corresponding to an external bit value received from outside the storage circuit can be adapted to also have a random number generation mode. The stable output bit value may be the same as the external bit value that was received or may be the complement of the external bit value. There is a direct one-to-one relationship between the external bit value and the stable output bit value when the storage circuit is operating in the normal mode. In the normal mode, the storage circuit receives the external bit value and, for example, under control of a clock signal, stores within the bit value storage circuit state which results in the output of a stable output bit value representing the external bit value.

The bit value storage circuit is configured to also provide a random number generation mode in which it oscillates. When the storage circuit is switched from the random number generation mode into the normal mode, the output bit value is formed as a stable pseudo random bit value, e.g. the final bit value of the oscillating bit value is captured at a phase effectively randomly positioned within its oscillation cycle.

The bit value storage circuit can be formed in a variety of different ways. In some embodiments, the bit value storage circuit comprises an inverter chain formed of a plurality of serially connected inverters with the input node located at a first position along this chain and the output node located at a second position along this change. Such an inverter chain is well suited to providing signal feedback that can be used to store stable bit values.

In some embodiments a multiplexer is disposed in the inverter chain and configured to switch a feedback path around the chain from containing an even number of inverters when the storage circuitry is operating in the normal mode to an odd number of inverters when the storage circuit is operating in the random number generation mode. When an odd number of inverters from the chain are selected, a free running oscillator is formed and this oscillates at a high frequency.

It will be appreciated that the number of inverters in the chain can vary. When the number of inverters is a low odd number, then a high frequency ring oscillator will be formed. If three inverters are used in a chain, then this will have a high frequency which is well suited to generating a pseudo random bit value when the oscillation is stopped at an arbitrary phase. This form uses a relatively low amount of additional resource over a chain employing two inverters which can be used to provide a feedback path during the normal mode.

While the storage circuit could have a variety of different forms, one example form is a master slave latch where the bit value storage circuit comprises a slave stage and the storage circuit further comprises a master stage coupled to the input node of the slave stage via a transmission gate. Such master slave latches are common within integrated circuits and one or more of these may be adapted to serve as a random number generator using the present techniques. These random number generators can be distributed through the circuit so as to render detection of their operation more difficult and so increase security associated with any random numbers which are generated.

Within the context of a master slave latch, the transmission gate is controlled by a clock signal and the random number generation mode may be conveniently supported within the slave stage when the transmission gate is blocking the signal path from the master stage to the slave stage.

When the transmission gate is blocking the signal path from the master stage to the slave stage, then a multiplexer used to switch the number of inverters stages in the inverter chain can be controlled to switch the slave stage between the normal mode and the random number generation mode.

The signal storage circuits of the present techniques are well suited for use within an apparatus for processing data which includes a signal whitening circuit that receives the stable pseudo random bit value from the storage circuit and performs processing dependent upon this pseudo random bit rate to generate a whitened pseudo random signal with a more even distribution of signal values over time than the raw pseudo random signal value. Whitening circuits which can take a signal with some degree of randomness and produce a signal with a more even distribution of randomness are useful in increasing the usability of the pseudo random bit value generated by the storage circuit.

Some example implementations embed within the whitening circuit one or more of the storage circuits which have both the normal mode and the random number generation mode. Such embedded storage circuits may effectively seed the whitening circuit with a random number which is then whitened. The embedded storage circuits provide entropy sources for the whitening circuit.

One useful form of whitening circuit is a linear feedback shift register in which one or more of the register stages may comprise storage circuits having the normal mode and the random number generation mode as described herein.

Viewed from another aspect the present invention provides a storage circuit having a normal mode for receiving and storing an external bit value and a random number generation mode, said data value storage circuit comprising:

bit value storage means for storing a bit value and having an input node for receiving an input bit value from outside said bit value storage circuit and an output node for outputting an output bit value;

wherein said bit value storage means is configured such that:

(i) when said storage circuit is operating in said normal mode, said bit value storage means generates at said output node as said output bit value a stable output bit value corresponding to said external bit value; and (ii) when said storage circuit is operating in said random number generation mode, said bit value storage means generates at said output node an oscillating output bit value and a change from said random number generation mode to said normal mode leaves said output bit value as a stable pseudo random bit value.

Viewed from a further aspect the present invention provides a method of operating a storage circuit having a normal mode for receiving and storing an external bit value and a random number generation mode, said method comprising the steps of:

storing a bit value within a bit value storage circuit having an input node for receiving an input bit value from outside said bit value storage circuit and an output node for outputting an output bit value;

when said storage circuit is operating in said normal mode, generating at said output node as said output bit value a stable output bit value corresponding to said external bit value; and when said storage circuit is operating in said random number generation mode, generating at said output node an oscillating output bit value such that a change from said random number generation mode to said normal mode leaves said output bit value as a stable pseudo random bit value.

The above, and other objects, features and advantages of this invention will be apparent from the following detailed description of illustrative embodiments which is to be read in connection with the accompanying drawings.

DESCRIPTION OF THE EMBODIMENTS

Figure 1:
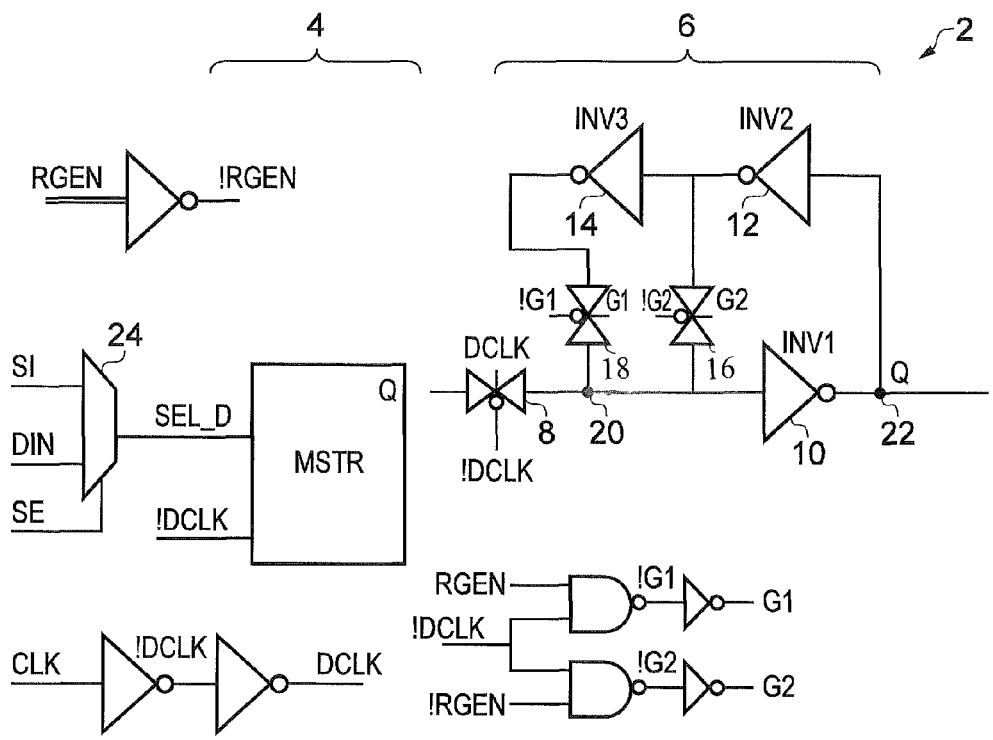
FIG. 1 schematically illustrates a storage circuit with a normal mode and a random number generation mode.

FIG. 1 schematically illustrates a storage circuit 2 in the form of a master slave latch. The master slave latch includes a master stage 4 separated by a transmission gate 8 from a slave stage 6. The slave stage 6 is a bit value storage circuit which operates in both a normal mode and a random number generation mode in dependence upon a mode selection signal RGEN. The slave stage 6 includes an inverter chain formed of three inverters 10, 12, 14. A multiplexer formed of transmission gates 16, 18 serves to select either the output from the inverter 14 or the output from the inverter 12 to be applied to an input node 20 of the slave stage 6.

When the multiplexer 16, 18 selects the output from the inverter 14 for supply to the input node 20, then there are an odd number of inverters (namely three) in the inverter chain 10, 12, 14 and accordingly a ring oscillator is formed and the output bit value at output node 22 oscillates. This oscillation will not be perfectly stable as factors such as supply noise and shot noise will influence the operation of the inverters 10, 12, 14.

When the multiplexer 16, 18 selects the output of the inverter 12 for supply to the input node 20, then there are an even number of inverters (namely two) in the inverter chain 10, 12 and accordingly a stable output bit value is generated at the output node 22 corresponding to an inverted version of the input bit value from the input node 20.

When the storage circuit 2 is switched from operating in the random number generation mode to the normal mode by the mode signal RGEN, then the output signal value at the output node 22 will be effectively frozen at its current value within the oscillation cycle. It will be appreciated that if the signal value is midway between its high and low level, then it will settle to one of these levels under action of the feedback of the inverters 10, 12 during the normal mode. Noise will also be present in the switching of the mode signal RGEN and this will help contribute to the randomness of the pseudo random bit value output from the output node 22 when the storage circuit 2 is switched from the random number generation mode to the normal mode.

The master stage 4 may similarly be formed of an inverter chain, but in this case will typically include only two inverters serving to provide stable feedback to maintain a signal value captured from the external signal DIN into the master stage 4 via the input multiplexer 24. The input multiplexer 24 in this example embodiment also includes a serial scan path SI under control of a scan enable signal SE, but it will be appreciated that such scan functionality is entirely optional.

Figure 2:
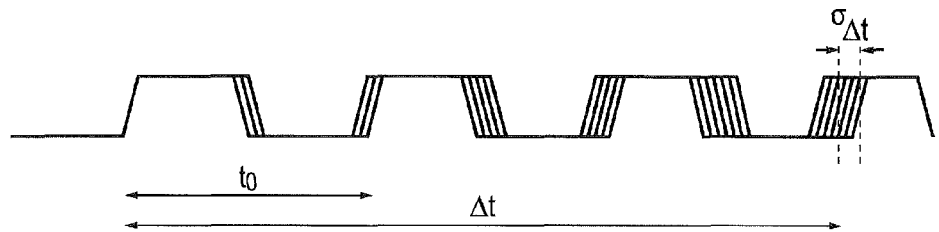
FIG. 2 schematically illustrates a clock signal with jitter in its clock edges which may be used to help generate a pseudo random bit value.

FIG. 2 is a signal diagram illustrating how the output from the output node 22 during oscillation can vary depending upon various factors influencing the free running ring oscillator formed by the inverter chain 10, 12, 14 during the random number generation mode. Factors such as substrate noise, power supply noise, drift as well as temperature variations can result in phase noise in the output bit value that effectively results in a random cycle-to-cycle jitter which then, when the output bit value is sampled, produces a stable pseudo random bit value.

Figures 3, 4:
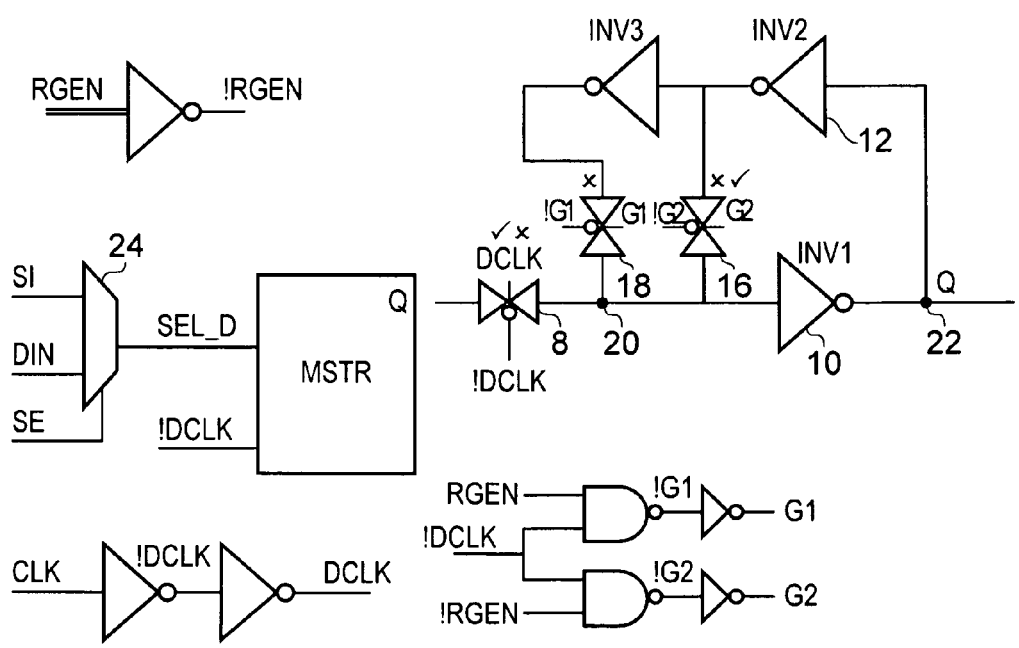
FIG. 3 is a truth table illustrating a variety of control signals for the circuit of FIG. 1.
FIG. 4 schematically illustrates the storage circuit operating in the normal mode.

FIG. 3 is a truth table illustrating the operation of the storage circuit 2 under control of a clock signal CLK and the mode signal RGEN. When the clock signal is low and the mode signal is high, then the storage circuit 2 operates in the random number generation mode with the ring oscillator 10, 12, 14 free running. When the clock signal CLK is high or the clock signal is low with the mode signal also being low, then the storage circuit 2 operates in the normal mode as a master slave latch to receive an external signal DIN, store that signal in the bit storage circuit (slave stage 6) and then output that signal. With the clock signal high the operation will be in the normal mode irrespective of the signal level of the mode signal.

FIG. 4 schematically illustrates the operation of the storage circuit 2 in the normal mode. In the normal mode the transmission gate 18 remains blocked such that there is no feedback chain of inverters comprising an odd number of inverters that would lead to oscillation. The transmission gate 16 is open when the transmission gate 8 is blocked and in this case the inverters 10, 12 provide feedback to generate a stable output bit value from the output node 22 in dependence upon the external bit value DIN supplied through the multiplexer 24 and via the master stage 4 and transmission gate 8 to the input node 20. When the transmission gate 8 is open, then the transmission gate 16 will be closed so that the feedback path from the output node 22 via the inverter 12 is blocked and accordingly the master stage 4 can impose a change in the input bit value at the input node 20.

Figure 5:
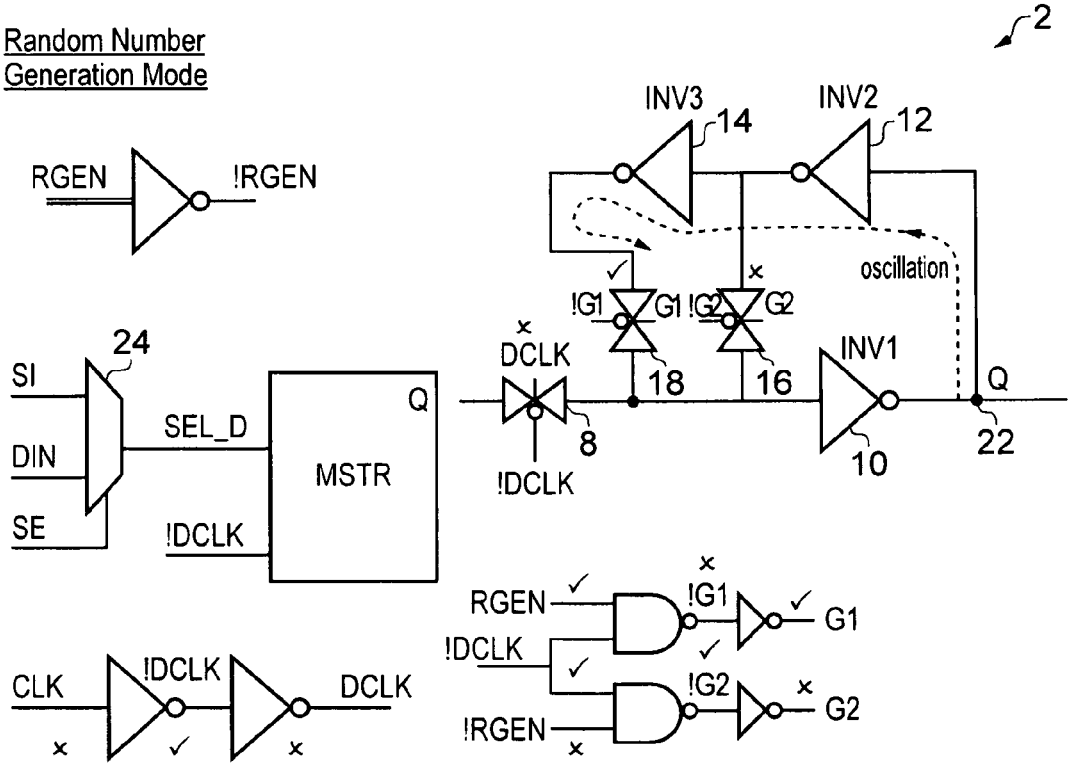
FIG. 5 schematically illustrates the storage circuit operating in the random number generation mode.

FIG. 5 schematically illustrates the operation of the storage circuit 2 during the random number generation mode. In the random number generation mode the transmission gate 8 is blocked, the transmission gate 18 is open and the transmission gate 16 is closed. The inverters 10, 12, 14 form an inverter chain with an odd number of inverters and accordingly provide a free running ring oscillator such that the signal at the output node 22 oscillates. When a return is made to the normal mode, then the transmission gate 18 will be blocked such that the oscillation ceases at a point in the oscillation cycle which is effectively randomly selected in phase relative to the oscillation cycle. Thus, the stable pseudo random bit value formed at output node 22 representing the frozen state will have a random value.

As illustrated in FIGS. 1, 4 and 5, the transmission gate 8 is controlled by a clock signal DCLK, !DCLK. The transmission gates 16, 18 which serve as a multiplexer to select the serial chain inverter length are controlled by signals G1, !G1, G2 and !G2, which are themselves derived from the clock signal !DCLK, the mode signal RGEN and the inverse of the mode signal !RGEN.

The master slave latch 2 of FIGS. 1, 4 and 5 operates in accordance with a method that:

stores a bit value within the slave stage 6 having an input node 20 for receiving an input bit value from outside the slave stage 6 and an output node 22 for outputting an output bit value;

when said master slave latch 2 is operating in the normal mode, generates at the output node 22 as the output bit value a stable output bit value corresponding to the external bit value DIN; and when said master slave latch 2 is operating in the random number generation mode, generates at the output node 22 an oscillating output bit value such that a change from the random number generation mode to the normal mode leaves the output bit value as a stable pseudo random bit value.

Figure 6:
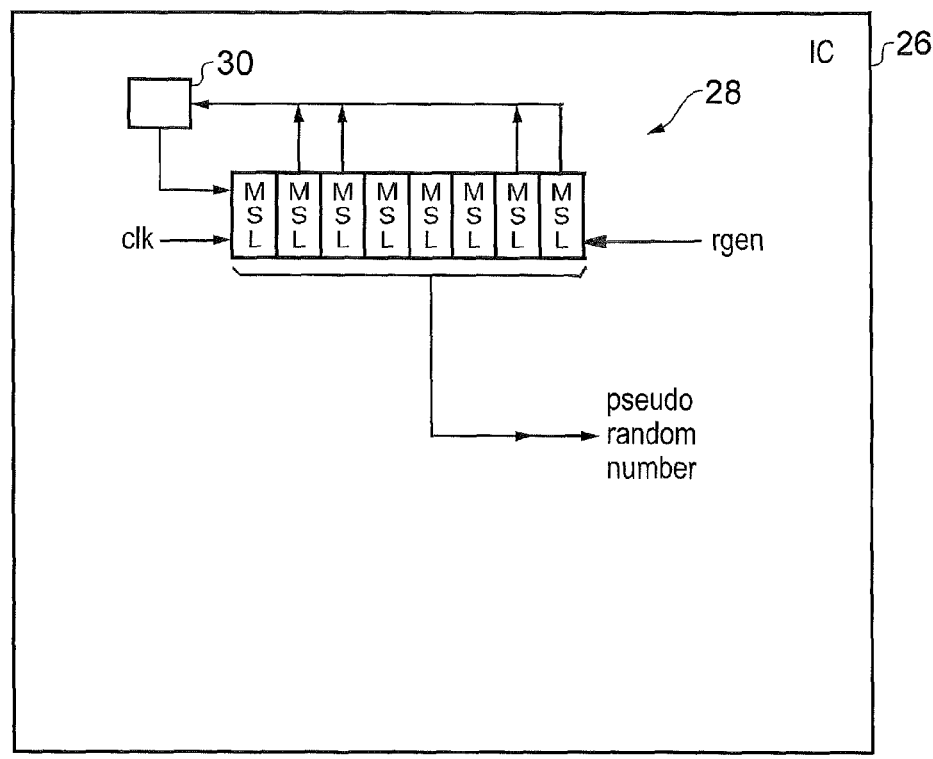
FIG. 6 schematically illustrates an apparatus for processing data including a whitening circuit in the form of a linear feedback shift register having multiple storage circuits with a random number generation mode embedded therein.

FIG. 6 schematically illustrates an apparatus for processing data such as an integrated circuit 26 which includes a whitening circuit in the form of a linear feedback shift register 28. The linear feedback shift register is itself formed of, in this example, eight master slave latches MSL of the form illustrated in FIG. 1. The outputs from selected ones of these master slave latches are supplied to a logical combination circuit 30 where they are subject to a logical combination and generate a feedback signal into the shift register which is clocked by a clock signal clk. The linear feedback shift register 28 can be seeded with a multi-bit pseudo random number using the master slave latches of FIG. 1. In particular, a mode signal rgen may be applied to switch each of the master slave latches MSL into a random number generating mode in which it oscillates. When the switch is made back to the normal mode, then pseudo random bit values will be captured into each of the master slave latches MSL. The differences in the form and the noise applied to the individual master slave latches will mean that there is little correlation between the pseudo random bit values which they capture and accordingly the seeding of the linear feedback shift register will be with a good pseudo random number.

If there is any skew in the generation of the pseudo random bit values by the master slave latches, then the random number will not be "white" i.e. have an even distribution over the possible bit values. The action of the linear feedback shift register 28 will rapidly whiten such a pseudo random signal so as to have a more even distribution of signal values. The master slave latches embedded within the linear feedback shift register 28 provide entropy sources for the whitening circuit in that they seed the whitening circuit with a pseudo random number.

Figure 7:
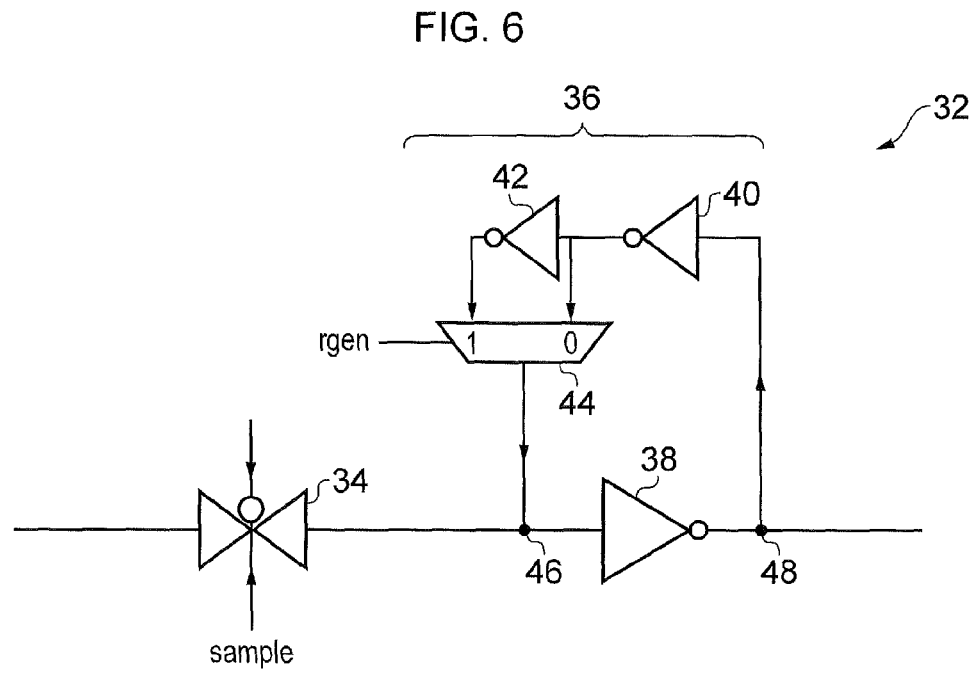
FIG. 7 schematically illustrates another example storage circuit in the form of a transparent latch having a random number generation mode.

FIG. 7 is a further example embodiment of a storage circuit 32 which may employ the present techniques. This example is a transparent latch formed of a transmission gate 34 and a bit value storage circuit 36. The bit value storage circuit 36 comprises three inverters 38, 40, 42 formed as an inverter chain. A multiplexer 44 under control of a mode signal rgen selects either the output from the second inverter 40 or the third inverter 42 for supply to an input node 46. The inverter 38 drives an output bit value on an output node 48 in dependence upon the input bit value at the input node 46.

In the normal mode the inverter 44 selects the output of the inverter 40 for supply to the input node 46. An external bit value signal received via the transmission gate 34 may overwrite whatever value is currently held at the input node 46 and force a new value onto the output node 48. The feedback path through the second inverter 40 could be temporarily interrupted to facilitate such an overwriting. In a random number generation mode, the multiplexer 44 selects the output from the inverter 42 for supply to the input node 46. The inverter chain 38, 40, 42 in the random number generation mode forms a free running ring oscillator such that the output bit value at the output node 48 oscillates. When a switch is made from the random number generation mode back to the normal mode, then a stable pseudo random bit value will be captured and output from the output node 48.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A storage circuit having a normal mode for receiving and storing an external bit value and a random number generation mode, said storage circuit comprising:
   a bit value storage circuit having an input node for receiving an input bit value from outside said bit value storage circuit and an output node for outputting an output bit value;
   wherein said bit value storage circuit is configured such that:
   (i) when said storage circuit is operating in said normal mode, said bit value storage circuit generates at said output node as said output bit value a stable output bit value corresponding to said external bit value; and
   (ii) when said storage circuit is operating in said random number generation mode, said bit value storage circuit generates at said output node an oscillating output bit value and a change from said random number generation mode to said normal mode leaves said output bit value as a stable pseudo random bit value.

2. The storage circuit as claimed in claim 1, wherein said bit value storage circuit comprises an inverter chain of a plurality of serial connected inverters with said input node located at a first position along said chain and said output node located at a second position along said chain.

3. The storage circuit as claimed in claim 2, wherein said bit value storage circuit comprises a multiplexer disposed in said inverter chain and configured to switch a feedback path around said chain from containing:
   (i) an even number of inverters when said storage circuit is operating in said normal mode; and
   (ii) an odd number of inverters when said storage circuit is operating in said random number generation mode.

4. The storage circuit as claimed in claim 3, wherein said odd number of inverters comprises three inverters serving as a ring oscillator.

5. The storage circuit as claimed in claim 3, wherein said even number of inverters comprises two inverters with one of said inverters serving to provide a feedback path from said second position to said first position.

6. The storage circuit as claimed in claim 3, wherein
   said storage circuit is a master slave latch, said bit value storage circuit comprises a slave stage and said storage circuit further comprises a master stage coupled to said input node of said slave stage via a transmission gate;
   transmission of signal values from said master stage to said slave stage is controlled by a clock signal applied to said transmission gate and said transmission gate is controlled by said clock signal having a blocking signal level not to transmit signal values from said master stage to said slave stage; and
   said multiplexer is controlled by a mode control signal when said clock signal has said blocking signal level to switch said storage circuit between said normal mode in which said inverter chain contains an even number of inverters and said random number generating mode in which said inverter chain contains an odd number of inverters.

7. The storage circuit as claimed in claim 1, wherein said storage circuit is a master slave latch, said bit value storage circuit comprises a slave stage comprising said input node and said storage circuit further comprises a master stage coupled to said input node of said slave stage via a transmission gate.

8. The storage circuit as claimed in claim 7, wherein transmission of signal values from said master stage to said slave stage is controlled by a clock signal applied to said transmission gate and said transmission gate is controlled by said clock signal having a blocking signal level not to transmit signal values from said master stage to said slave stage during said random number generation mode.

9. Apparatus for processing data comprising a storage circuit as claimed in claim 1 and further comprising:
   a signal whitening circuit coupled to receive said stable pseudo random bit value from said storage circuit and configured to perform processing dependent upon said pseudo random bit value to generate a whitened pseudo random signal having a more even distribution of signal values over time than said pseudo random signal value.

10. The apparatus as claimed in claim 9, wherein said storage circuit is embedded within said whitening circuit to provide an entropy source for said whitening circuit.

11. The apparatus as claimed in claim 10, wherein a plurality of storage circuits as claimed in claim 1 are embedded within said whitening circuit to provide a plurality of entropy sources for said whitening circuit.

12. The apparatus as claimed in claim 9, wherein said whitening circuit is a linear feedback shift register circuit.

13. A storage circuit having a normal mode for receiving and storing an external bit value and a random number generation mode, said storage circuit comprising:
   means for storing a bit value and having an input node for receiving an input bit value from outside said bit value storage circuit and an output node for outputting an output bit value;
   wherein said means for storing is configured such that:
   (i) when said storage circuit is operating in said normal mode, said means for storing generates at said output node as said output bit value a stable output bit value corresponding to said external bit value; and
   (ii) when said storage circuit is operating in said random number generation mode, said means for storing generates at said output node an oscillating output bit value and a change from said random number generation mode to said normal mode leaves said output bit value as a stable pseudo random bit value.

14. A method of operating a storage circuit having a normal mode for receiving and storing an external bit value and a random number generation mode, said method comprising the steps of:
   storing a bit value within a bit value storage circuit having an input node for receiving an input bit value from outside said bit value storage circuit and an output node for outputting an output bit value;
   when said storage circuit is operating in said normal mode, generating at said output node as said output bit value a stable output bit value corresponding to said external bit value; and
   when said storage circuit is operating in said random number generation mode, generating at said output node an oscillating output bit value such that a change from said random number generation mode to said normal mode leaves said output bit value as a stable pseudo random bit value.

* * * * *